United States Patent

Alain et al.

[11] Patent Number: 5,970,649
[45] Date of Patent: Oct. 26, 1999

[54] MULTI-FUNCTION ADJUSTABLE FISHING FLOAT

[75] Inventors: Segond Alain; Segond Colette, both of Broquies, France

[73] Assignee: Herve Laurent, Los Angeles, Calif.

[21] Appl. No.: 09/066,094

[22] Filed: Apr. 23, 1998

[51] Int. Cl.⁶ .................................................. A01K 93/00
[52] U.S. Cl. ..................... 43/43.14; 43/44.91; 43/44.87
[58] Field of Search .................... 43/43.1, 43.15, 43/44.87, 44.9, 44.91, 44.92, 44.94, 43.14

[56] References Cited

U.S. PATENT DOCUMENTS

| 3,990,172 | 11/1976 | Hargquist | 43/43.14 |
| 4,656,777 | 4/1987 | Fernbach | 43/44.9 |
| 4,693,030 | 9/1987 | Wohead | 43/42.22 |
| 4,944,113 | 7/1990 | Jean | 43/43.14 |
| 5,651,210 | 7/1997 | Moore | 43/43.14 |

FOREIGN PATENT DOCUMENTS

| 2007165 | 2/1970 | Germany | 43/43.14 |

*Primary Examiner*—Robert P. Swiatek
*Assistant Examiner*—Son T. Nguyen

[57] ABSTRACT

A multi-function adjustable fishing float that can also be used as a sink or as a bait dispenser. The float comprises a hollow tubular body (10) closed at one of its extremity by a cap (14) ending in a neck (16), a stem (30) which carries both a piston (20) and a floating element. The stem passes through the neck of the cap, whereby forming a hermetic chamber in the tube, delimited by the tube, the cap, and the piston. By moving the stem while holding the tube, air can be sucked into the chamber and therefore modify the density of the float.

14 Claims, 5 Drawing Sheets

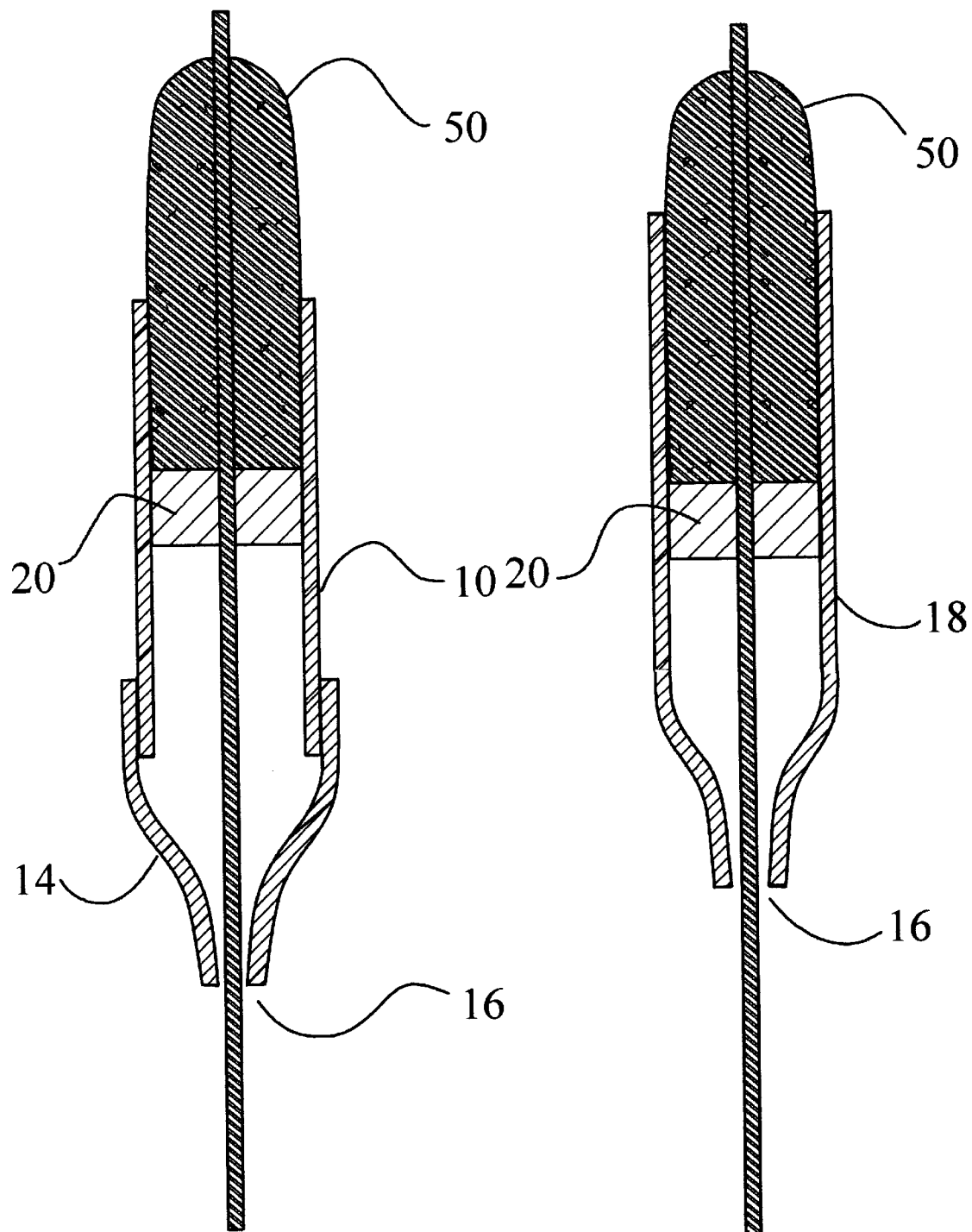

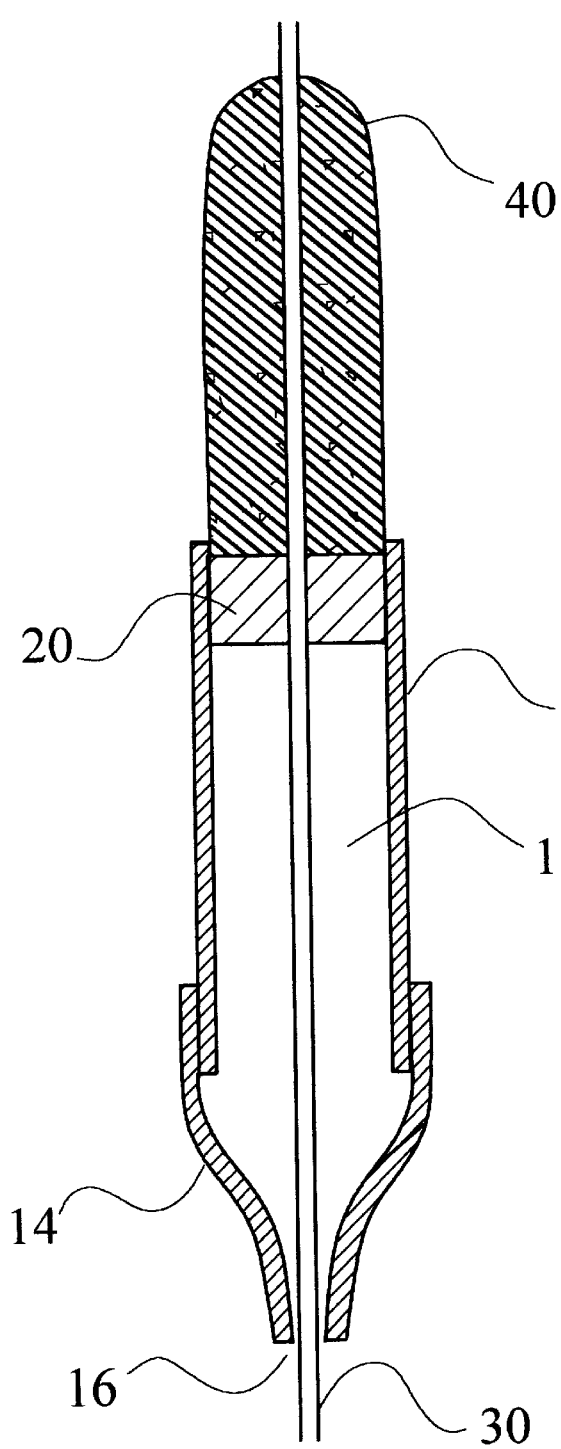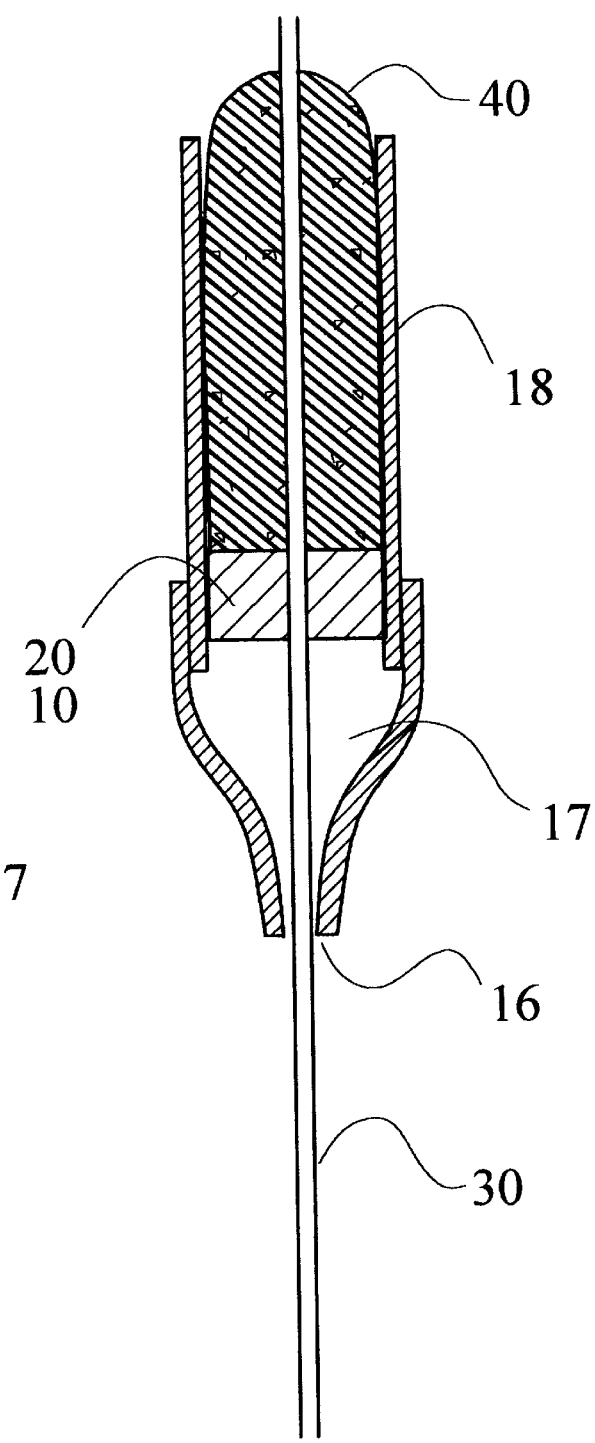
FIG 6A  FIG 6B

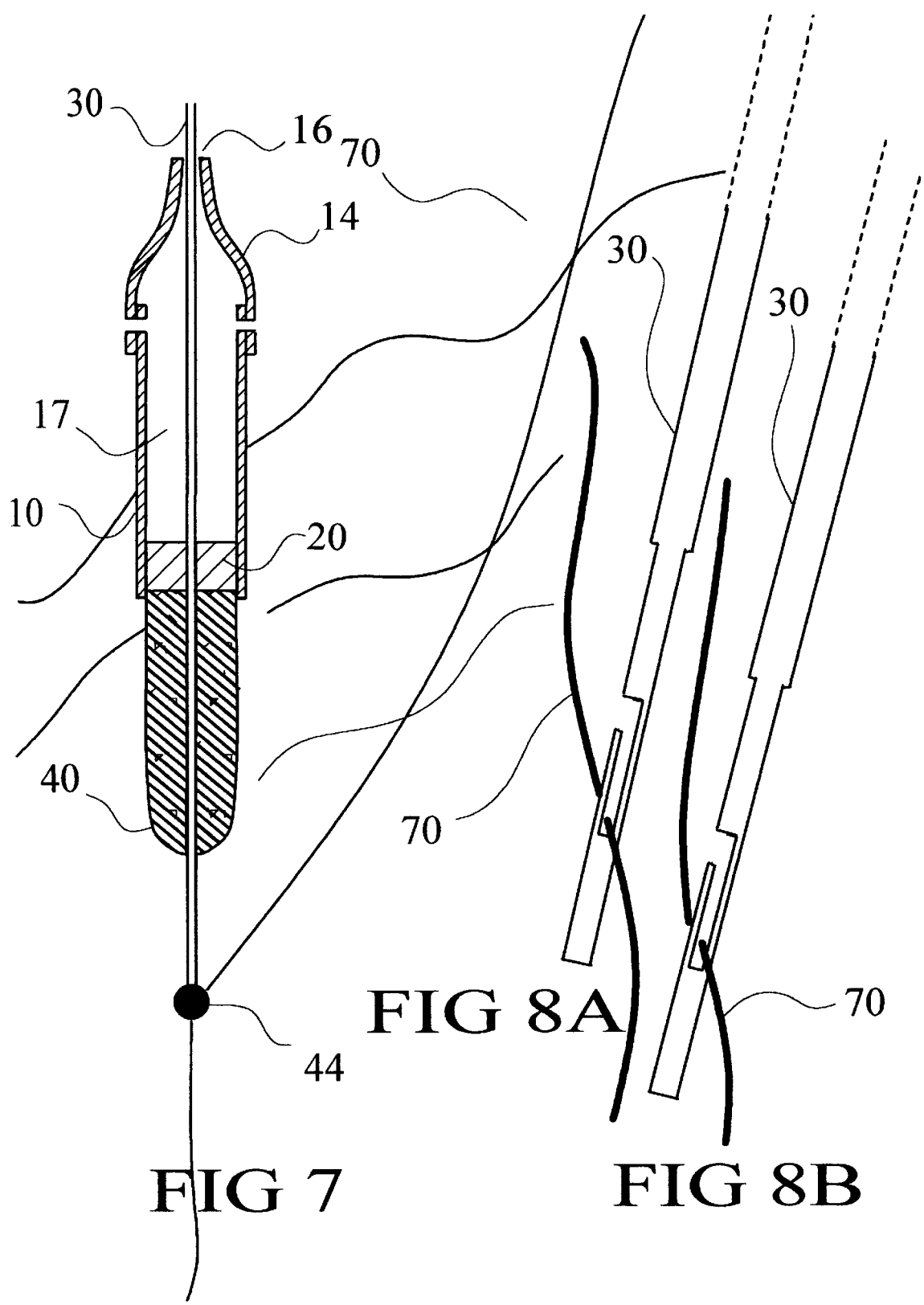

MULTI-FUNCTION ADJUSTABLE FISHING FLOAT

CROSS-REFERENCE TO RELATED CASE

This application is the U.S. application of pending French application Ser. NO. 97 147 56 filed on Nov. 21, 1997

BACKGROUND

1. Field of the Invention

This invention relates generally to fishing gear that is connected to a fishing line, and more particularly to fishing floats, sinkers and bait dispensers.

2. Description of Prior Art

Regular fishing floats have their volume, shape, density, and weight that are invariable. While those floats are very accurate, fishermen must own and carry a lot of them to face all kind of fishing situations. In addition, every time a fisherman wants to swap floats, which can happen frequently while fishing, it is time consuming and tiresome, especially when it sometimes requires to cut the fishing line.

For those reasons, inventors have created several types of floats that are adjustable. Prior art known to the applicants is disclosed in the following listing of patents:

GB-A-2 263 218 (DAVIS)
DE-A-37 00 141 (SMOLARECK)
DE-U-87 07 655 (FRANK)
DE-A-40 27 737 (SIPPL)
DE-A-24 07 154 (KATT)
GB-A-2-148 081 (SWINDELLS)
U.S. Pat. No. 2,986,839 (CRIMBLE)
GB-A-2 186 171 (CHETWODE AIKEN)
FR-A-2 444 0691 (WECK)
FR-A-2 597 718 (RASSON)
FR-A-2 440 691 (SEGOND)

While some of the inventions described in those patents have some interesting features, they all suffer from at least one of the following disadvantages:

(a) Their manufacture is complicated and requires specific and expensive machinery.
(b) They are composed of numerous parts which makes them expensive to produce.
(c) They do not include means to allow the fishing line to pass through them.
(d) Their structural design doesn't allow their adjustment to stay at the same level while fishing.
(e) Their adjustment is complicated.
(f) They are fragile.
(g) Their design is not appealing.
(h) They can only be used as a floats.

Object and Advantages

Accordingly, besides the objects and advantages of the multipurpose adjustable fishing float described in my above patent, several objects and advantages of the present invention are:

(a) To provide a multi-function adjustable fishing float that doesn't require expensive manufacturing tools.
(b) To provide a multi-function adjustable fishing float that has a reduced number of parts.
(c) To provide a multi-function adjustable fishing float that includes a hollow stem for allowing a fishing line to run through it.
(d) To provide a multi-function adjustable fishing float whose adjustment will stay in place when the float is being used.
(e) To provide a multi-function adjustable fishing float which can be visually adjusted whereby making it very easy.
(f) To provide a multi-function adjustable fishing float that is strong thanks to its concept and its simplicity.
(g) To provide a multi-function adjustable fishing float which has an appealing appearance.
(h) To provide a multi-function adjustable fishing float that can be used as a float, as a sinker, and as a bait dispenser.

Further object and advantages are to provide anglers with an inexpensive multi-function adjustable fishing float that will avoid the need to have a multitude of regular fishing floats, that will even allow better fine-tuning during fishing and whose adjustment will be visual, thus making it particularly easy to work with.

Still further objects and advantages will become apparent from a consideration of the ensuing description and drawings.

DRAWING FIGURES

In the drawings, closely related figures have the same number but different alphabetic suffixes.

FIG. 4 shows a cross-sectional side view of a third embodiment where the stem and the solid element of the first embodiment are one part.

FIG. 5 shows a cross-sectional side view of a fourth embodiment which is a combination of the second and the third embodiment.

FIGS. 6A and 6B show two extreme adjustments for the first embodiment.

FIG. 7 shows a way of using the multi-function adjustable fishing float.

FIGS. 8A and 8B show a stem integrating an fishing line attachment means.

Figure 1A:
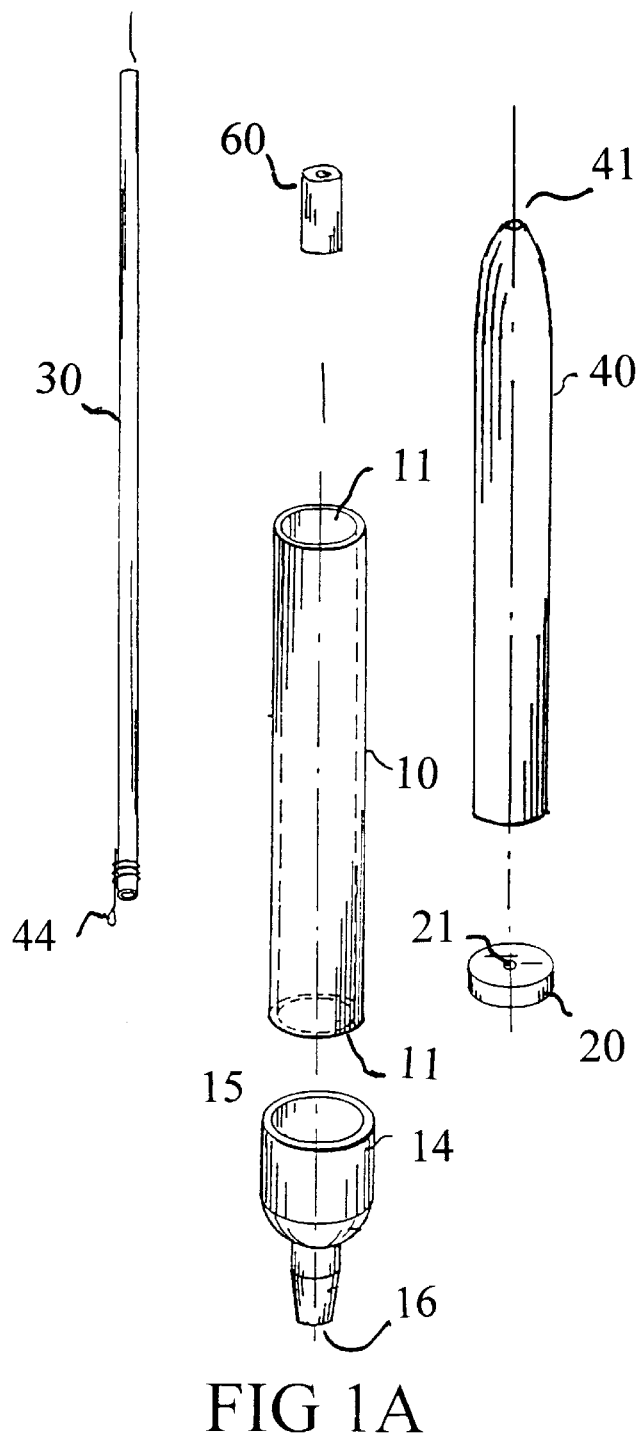
FIGS. 1A to 1C shows a perspective view of the elements from different embodiments.

Reference Numerals in Drawings 10 hollow tubular body
11 opening of hollow tubular body
12 through-hole
14 cap
15 opening of cap
16 neck
17 chamber
18 hollow tubular body and cap in one part
20 piston
21 hole of piston
24 ring
30 stem
32 stem with fishing line attachment means
40 solid element
41 hole of solid element
42 groove
44 attachment means for a fishing line
46 solid element with a groove
50 stem and solid element in one part
60 weight
70 fishing line

SUMMARY

In accordance with the present invention a multi-function adjustable fishing float comprises a hollow tubular body with a cap, ending in a neck, at one of its extremity and a stem carrying both a piston and a solid element which slides as one element inside the tubular body.

Description—FIGS. 1 to 6

FIG. 1A shows an exploded view of a first embodiment of the present invention. Hollow tubular body 10 has the most simple and basic shape of a hollow tube. Both openings of hollow tubular body 11 are identical The inside is perfectly smooth so that to act as a cylinder for the piston 20. The outside on the other hand can eventually have an irregular shape of any kind except on some of its outer surface next to at least one of the two openings, to allow hermetic connection with cap 14. Because it is less expensive to produce a tube with an even surface on the complete outside surface and because of the fact it looks better this way, this is the way we choose it for the preferred embodiment. The tube is preferably made of synthetic material such as plastic, which can be hard or slightly soft. The softer the plastic, the easier to cut the tube with a knife as a fisherman may choose to do. The tube is preferably transparent or translucent so that the adjustment of the float is even more visual.

Stem 30 is also a very basic and simple part since it is also basically a tube. As illustrated in FIG. 1A the stem is rather thin in reference to its length since the stem not only passes through the hollow tubular body but also through neck 16 of cap 14, whose neck has an inner section smaller than the inner section of the hollow tubular body. The stem in the preferred embodiment is made of synthetic material such as plastic. It has preferably a certain flexibility to make it safer for the user and less likely to break. It is not too flexible so that piston 20 can remain in the same axle with the tubular body, when moved. In the preferred embodiment the stem is hollow, thus allowing fishing line 70 to go through it. However, the stem can be plain and have a fishing line attachment means either integrated, as shown on FIGS. 8A and 8B, or attached to it, as shown on FIG. 1A. The stem can also be hollow and have additional attachment means.

Cap 14 is imbricated on one of the two outer extremity of the hollow tubular body. For this purpose it has a tubular or cylindrical shape on one end. Opening of cap 15 has its inner section of the same diameter as the outer section of the tubular body, or very slightly less. This way, it makes the connection tighter and perfectly hermetic. It can be made of the exact same synthetic material as for the tubular body, or be configured to be softer. In the preferred embodiment it is manufactured with a softer synthetic material than the one used for the tubular body; this way, it can be imbricated more easily in force on the tube and be connected hermetically. Eventhough hermetic connection is easily attained this way, and eventhough not represented in the drawings, they are many ways to modify the way the cap is attached hermetically to the tube. One of them is to make a groove on the outer surface of the tube and insert an O-ring which will be sandwiched between the cap and the tube. An other way is to make a groove on either the outer surface of the tube or the inner surface of the cap and to make a protuberance on the other part to fit the groove. In the second case it is then particularly critical to make the cap in a material that is substantially softer than the one of the tube so that the connection can still be made easily. The tubular part of the cap then shapes coaxialy into neck 16. The transition area has a conic shape in the preferred embodiment of the invention but it could have a different shape. Neck 16 is the most critical area of the float since this is where the stem passes through, yet allowing air to be sucked in between. The play is minimal so that water cannot enter once the float is at a given adjustment, whatever position in the water or at its surface it may be. Yet it is big enough to allow the float to be adjusted easily. In the preferred embodiment of the invention, the neck itself has a truncated cone like shape so that the actual area in contact with the stem is minimum such to prevent water to enter the chamber and not to restrain air to be sucked in or out.

The stem carries piston 20 and solid element 40. The stem carries the piston through its hole 21. The section of the hole of the piston is smaller than the diameter of the stem in such a way that the resulting friction force is enough to keep the piston in a fixed position on the stem when the piston slides in the hollow tubular body. The stem carries the solid element through its hole 41. The section of the hole of the solid element is smaller than the diameter of the stem in such a way that the resulting friction force is enough to keep the solid element in place on the stem while moving the piston through the solid element. Yet the way those three previous part are assembled allows easy dismantling without any tool. It is also possible to do the assembly with glue in a more permanent way. Piston 20 is made either from rubber or from other type of flexible synthetic material like plastic which can have the same characteristics as rubber. A plain cylindrical shape, except for the hole, allows the piston to slide through the hollow tubular body hermetically. Solid element 40 is elongated so that it can enter at least partially in the hollow tubular body. In the preferred embodiment, the solid element is positioned right next to the piston on the stem and its shape is cylindrical with a diameter slightly below the section of the tubular body so that it can fill in the tube when the piston is in the lower position. The solid element can be made out of any of the materials presently used for regular floats.

There are two optional elements shown in FIG. 1A.

One is weight 60 which consists of a piece of high density material such as lead. In the preferred embodiment, the weight has a through hole so that it can also be carried by the stem. It can be positioned below the piston and has such a shape that it can fill the available space of the cap before the neck when the piston is in its lower position.

The other optional element is attachment means for a fishing line 44, which allows the float to be attached to the fishing line 70, as shown on FIG. 7 without running the line through the stem.

Figure 1B:
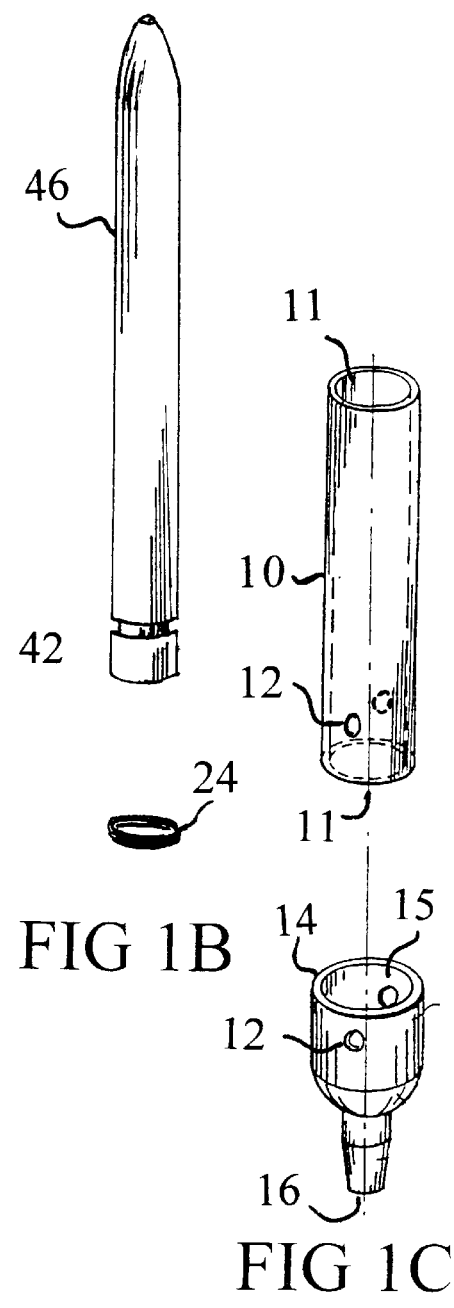

FIG. 1B shows alternative elements to replace the solid element and piston previously described. Solid element with a groove 46 has the same general shape as solid element 40 but comprises a groove 42 for receiving ring 24. The groove is located at the extremity of the solid element that slides first into the hollow tubular body. It is placed on the circumference of the solid element, in the virtual plan perpendicular to its virtual axis. The solid element with a groove is made in a hard material so that to act as a piston with a ring.

Figure 2:
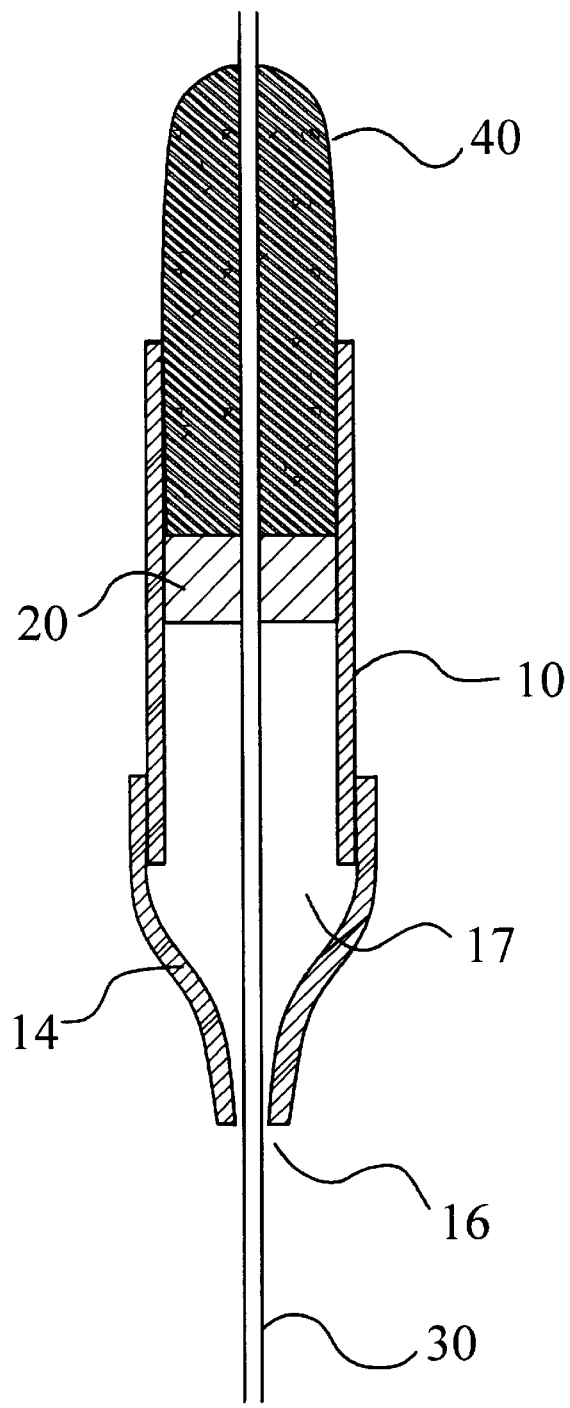
FIG. 2 shows a cross-sectional side view of a first embodiment.
Figure 3:
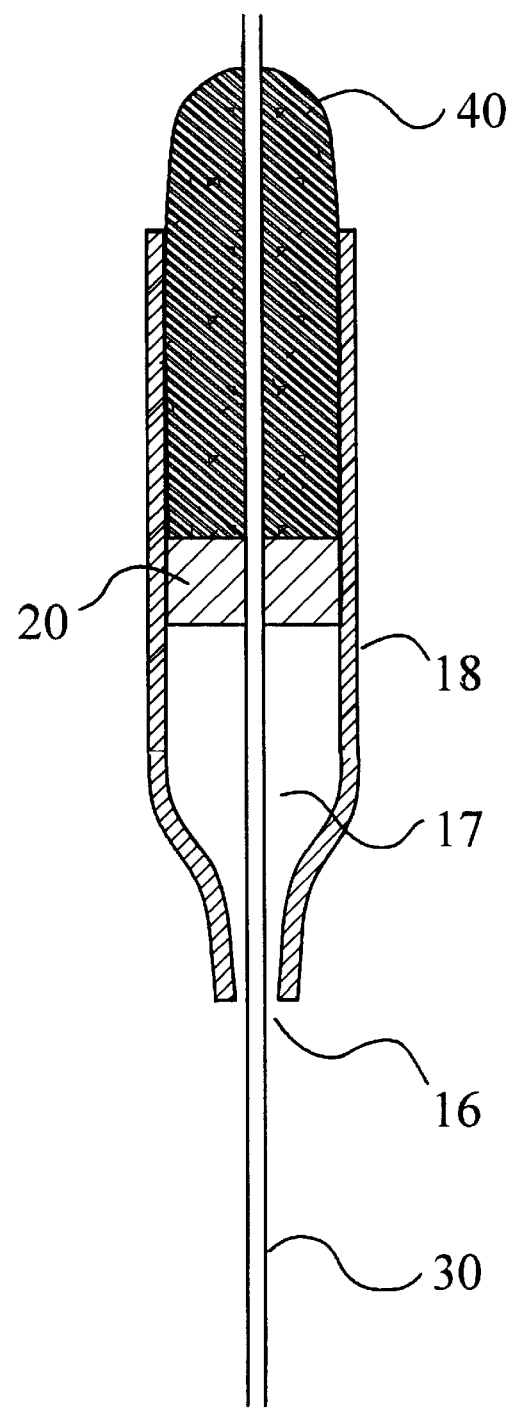
FIG. 3 shows a cross-sectional side view of a second embodiment where the tube and the cap of the first embodiment are now one part.

Various embodiments of the present invention are shown in FIGS. 2 to 5. In FIG. 2, a cross section of the float with the parts discussed in FIG. 1A shows clearly chamber 17 delimited by the hollow tubular body with the cap whose neck is filled with the stem and the piston. This embodiment is the most versatile with the most parts. FIG. 3 shows another embodiment of the float where hollow tubular body and cap in one part 18 replaces the two previous parts, thus creating a more sleek-locking float. FIGS. 4 and 5 show two other embodiments based on the respective embodiments of FIGS. 2 and 3 but were the stem and the solid elements are now one part.

Operation—FIGS. 2 to 8

Eventhough the multi-function adjustable fishing float can be used in many different positions in regards to the surface of the water, we'll consider the position shown in FIGS. 2 to 5 as the standard one.

The manner to use the multi-function adjustable fishing float is very different from the one for regular floats. With regular floats, once the angler knows approximately the type of float he wants to use, he chooses one and then tries to adjust the weight to the float. With the present invention, the anglers chooses the weight and then adapts the float to it by adjusting it.

The multi-function adjustable fishing float can be used as a float and as a sinker in two different ways. First, if the elongated solid element has a density higher than the density of water, it will always float, whatever the adjustment is, as long as it doesn't have any optional weight into the chamber, and supposing the density of the rest of the float is 1, as water, to simplify the explanation. To make it a sinker, it is then necessary to insert a weight into the chamber or anywhere on the float. In the latter case, the weight can for instance be hooked anywhere on the stem, whether through a hole or with any other means. It can be placed below the cap, above the solid element or even between the piston and the solid element. To allow the multi-function adjustable fishing float to be a sinker, the weight must at least offset the density of the float at its lowest adjustment when there is no air in the chamber. If the weight offsets slightly the density of the float at its lowest adjustment, the adjustable float will be a sinker at the lowest adjustment and will be a float as soon as some air is introduced into the chamber. If the weight offsets the density of the adjustable float only at the higher adjustment, then the adjustable float becomes an adjustable sinker that cannot float. Second, if the elongated solid element has a density below the density of water, it can also be either an adjustable sinker, or a float that can be a sinker, depending on how much below the density of water the density of the solid element is.

Figure 1C:
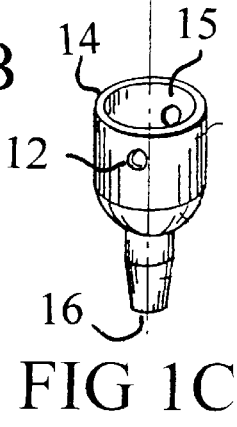

Optional through holes 12 of FIG. 1C in both the cap and the lower part of the hollow tubular body are such that they can open chamber 17 through those holes when the holes of the cap and the holes of the hollow tubular body are matched. They can be as many holes as the circumference of both the cap and the hollow tubular body permits, as long as they are placed on each part so that they can be matched by turning the cap on the hollow tubular body and so that there is enough area between the holes so that they all can be unmatched. The optional holes allow two different functions for the use of the multi-function adjustable fishing float.

First, as illustrated in FIG. 7, the float can be used upside down. If the holes of the cap and the holes of the hollow tubular body are at least partially matched, then the chamber becomes open but remains filled with air as long as the float is in its vertical floating position. If a fish is caught, as soon as the float is pulled into the water by the fish, the water will fill the chamber whereby increasing the density of the float, offering less resistance to the fish. This way, the fish will be less likely to detect the presence of the float.

The same configuration can be used to allow the fisherman to gradually increase the density of the float at distance, without touching the float. The only requirement is to attach the line on the stem, at the opposite side of the cap, as illustrated for instance in FIG. 7. The angler will slightly pull the float into the water, allowing some water to enter the chamber. The angler will repeat this operation as many times as necessary to get the desired adjustment.

Second, the multi-function adjustable fishing float can be used as a bait dispenser. Bait can be disposed into the chamber by removing the cap or by removing the stem with its piston and solid element. Once the float put back together, the chamber is left open by matching the holes of the cap with the one of the hollow tubular body so that water can fill it and also allow the bait to be detectable in the surrounding of the float. The multi-function adjustable fishing float used as a bait dispenser can be floating or sinking depending on the density of the float, set either by the solid element, or the weight.

Summary, Ramification, and Scope

Accordingly, the reader will see that the multi-function adjustable fishing float can be used as a float, as a sinker or as a bait dispenser, that it can be configured to have all those functions in one, and that this can be performed without removing the multi-function adjustable fishing float from the fishing line. In addition the multi-function adjustable fishing float can be sold in a kit with for instance different solid elements and stems, allowing with very few parts to replace very many regular float or sinkers or bait dispensers. Furthermore, the multi-function adjustable fishing float has the additional advantages in that:

it doesn't require expensive tooling for its production.

as an adjustable float, it comprises a reduced number of parts.

it is structured in a way that makes it reliable.

it has a visual adjustment which makes it easy to understand how it functions and easy to operate.

Although the description above contains many specifications, these should not be construed as limiting the scope of the invention but as merely providing illustrations of some of the presently preferred embodiments of this invention. For example the section of the elongated solid element that doesn't go into the hollow tubular body can have any kind of shape.

Thus the scope of the invention should be determined by the appended claims and their legal equivalents, rather than by the example given.

We claim:

1. A multi-function adjustable fishing float, comprising:
   (a) a hollow tubular body completely open at both of its extremities,
   (b) a cap which can be hermetically imbricated in force to one extremity of said hollow tubular body, said cap having a coaxial neck whose inner section is smaller than the inner section of said hollow tubular body,
   (c) at least one internal piston which is adapted to slide hermetically inside of said hollow tubular body, said piston having a axial through-hole and said piston creating with said cap an adjustable chamber inside said hollow tubular body,
   (d) an elongated solid element having a axial through-hole, said elongated solid element being able to be introduced slidably at least partially into said hollow tubular body,
   (e) an elongated stem carrying hermetically said piston through its hole and carrying the solid element through its hole, said elongated stem being longer than said hollow tubular body and said elongated stem having an external diameter allowing it to slide through the neck of said cap and such that once air or water is introduced in force into said adjustable chamber, it will be retained in the chamber as long as said piston is in a fixed position in said hollow tubular body.

2. The multi-function adjustable fishing float of claim 1 wherein said elongated stem is hollow and open at both of its extremities so that a fishing line can be inserted freely through the stem.

3. The multi-function adjustable fishing float of claim 1 wherein said stem comprises at least one removable device that is securely attached to said stem, said device having means to connect said fishing float to a fishing line without said fishing line having to pass through the stem, said device also being able to prevent said piston to come off said hollow tubular body by preventing said stem to slide through said neck as long as said device is positioned at an appropriate predetermined level on said stem.

4. The multi-function adjustable fishing float of claim 1 wherein said stem includes attachment means to connect said multi-function adjustable fishing float to a fishing line.

5. The multi-function adjustable fishing float of claim 1 wherein said cap and said hollow tubular body each have at least one through-hole in their respective adjacent surfaces whereby allowing water to be introduced spontaneously when said through-holes are matched together by rotating said cap around said hollow tubular body.

6. The multi-function adjustable fishing float of claim 1 further including in said adjustable chamber at least one solid of density higher than the density of water wherein increasing the overall density of said multi-function adjustable fishing float.

7. The multi-function adjustable fishing float of claim 1 wherein said hollow tubular body comprises at least several through-holes (so that bait placed inside said fishing float can be diffused into water surrounding said fishing float).

8. The multi-function adjustable fishing float of claim 1 wherein said elongated stem and said elongated solid element are one element.

9. A multi-function adjustable fishing float, comprising:
(a) a hollow tubular body completely open at one of its extremity, the other extremity of said hollow tubular body ending in a coaxial neck whose inner section is smaller than the inner section of said hollow tubular body,
(b) at least one internal piston which is adapted to slide hermetically inside of said hollow tubular body, said piston having a axial through-hole and said piston creating with said hollow tubular body an adjustable chamber inside the tubular body
(c) an elongated solid element, said elongated solid element having a axial through-hole, said elongated solid element being able to be introduced slidably at least partially into said hollow tubular body,
(d) an elongated stem carrying hermetically said piston through its hole and carrying elongated solid element through its hole, said elongated stem being longer than said hollow tubular body and said elongated stem having an external diameter allowing it to slide through said coaxial neck such that once air or water is introduced in force into said adjustable chamber, it will be retained in the chamber as long as said piston is in a fixed position in said hollow tubular body.

10. The multi-function adjustable fishing float of claim 9 wherein said elongated stem and said elongated solid element are one element.

11. A multi-function adjustable fishing float, comprising:
(a) a hollow tubular body completely open at one of its extremity, the other extremity of said hollow tubular body ending in a coaxial neck whose inner section is smaller than the inner section of said hollow tubular body,
(c) an elongated solid element having a axial through-hole, said elongated solid element being able to be introduced slidably at least into said hollow tubular body, said elongated solid element having a groove surrounding a section the solid element which slides in the tubular body.
(d) a ring that fits the groove of said elongated solid element so that said elongated solid element can slide hermetically inside said hollow tubular body whereby creating an hermetical adjustable chamber inside said hollow tubular body,
(e) an elongated stem carrying hermetically said elongated solid element through its hole, said elongated stem being longer than said hollow tubular body and said elongated stem having an external diameter allowing it to through said coaxial neck such that once air or water is introduced in force into said adjustable chamber, it will be retained in the chamber as long as said piston is in a fixed position in said hollow tubular body.

12. The multi-function adjustable fishing float of claim 11 wherein said elongated stem and said elongated solid element are one element.

13. The multi-function adjustable fishing of claim 11 whereby said hollow tubular body is completely open at both of its extremities and further including a cap which can be hermetically imbricated in force to one extremity of said hollow tubular body, said cap having a coaxial neck whose inner section is smaller than the inner section of said hollow tubular body.

14. The multi-function adjustable fishing float of claim 11 wherein said elongated stem and said elongated solide element are one element and whereby said hollow tubular body is completely open at both of its extremities and further including a cap which can be hermetically imbricated in force to one extremity of said hollow tubular body, said cap having a coaxial neck whose inner section is smaller than the inner section of said hollow tubular body.

* * * * *